United States Patent
Gui et al.

(10) Patent No.: US 7,933,867 B1
(45) Date of Patent: Apr. 26, 2011

(54) MAINTAINING VIEWS OF CUBE-BASED OPERATIONS IN A DATABASE SYSTEM

(75) Inventors: Hong Gui, Madison, WI (US); Ambuj Shatdal, Madison, WI (US); Curt J. Ellmann, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 709 days.

(21) Appl. No.: 10/706,656

(22) Filed: Nov. 12, 2003

(51) Int. Cl.
*G06F 17/00* (2006.01)
(52) U.S. Cl. .................................................. 707/624
(58) Field of Classification Search ................. 707/2, 3, 707/100, 609, 610, 612, 614, 624
See application file for complete search history.

(56) References Cited

U.S. PATENT DOCUMENTS

| | | | |
|---|---|---|---|
| 6,775,662 B1* | 8/2004 | Witkowski et al. .................. 1/1 |
| 7,035,843 B1* | 4/2006 | Bellamkonda et al. ........... 707/3 |
| 7,058,640 B2* | 6/2006 | Le ........................................ 1/1 |
| 7,111,020 B1* | 9/2006 | Gupta et al. ......................... 1/1 |
| 7,158,994 B1* | 1/2007 | Smith et al. .................. 707/717 |
| 7,181,450 B2* | 2/2007 | Malloy et al. ....................... 1/1 |
| 7,181,452 B1* | 2/2007 | Luo et al. ............................. 1/1 |
| 2003/0093407 A1* | 5/2003 | Cochrane et al. ................ 707/2 |
| 2004/0260684 A1* | 12/2004 | Agrawal et al. .................. 707/3 |

OTHER PUBLICATIONS

Jose A. Blakeley, Per-Ake Larson, Frank Wm Tompa, Efficiently updating materialized views, Proceedings of the 1986 ACM SIGMOD international conference on Management of data, p. 1-11, May 28-30, 1986, Washington, D.C., United States.*

Segev, A.; Park, J.; , "Updating distributed materialized views," Knowledge and Data Engineering, IEEE Transactions on, vol. 1, No. 2, pp. 173-184, Jun. 1989.*

Cubetree: Organization of and Bulk Incremental Updates on the Data Cube (1997) by Nick Roussopoulos, Yannis Kotidis, Mema Roussopoulos Proceedings of the 1997 ACM SIGMOD Conference.*

Inderpal Singh Mumick et al., "Maintenance of Data Cubes and Summary Tables in a Warehouse," Proceedings of SIGMOD '97, AZ, USA, pp. 100-111 (1997).

Frank Dehne et al., "Computing Partial Data Cubes for Parallel Data Warehousing Applications," 8 pages (2001).

Sunita Sarawagi, "On Computing the Data Cube," pp. 1-18 (1996).

Jim Gray et al., "Data Cube: A Relational Aggregation Operator Generalizing Group-By, Cross-Tab, and Sub-Totals," pp. 1-9 (1995).

Rajiv Tewari, "Optimizing Cube Performance with OLAP Services: Processing times for each storage type," pp. 1-4, printed from http://www.sqlmag.com (as early as Sep. 2000). Rajiv Tewari, "Optimizing Cube Performance with OLAP Services: These test results reveal concrete steps you can take to improve multidimensional database performance," pp. 1-3,(as early as Sep. 2000).

IBM Redbooks, "DB2 OLAP Server Theory and Pratices," pp. 1-263 (2001).

* cited by examiner

*Primary Examiner* — Luke S. Wassum
*Assistant Examiner* — Robert Timblin
(74) *Attorney, Agent, or Firm* — Trop, Pruner & Hu P.C

(57) ABSTRACT

A database system includes a storage to store a view containing results of a cube-based operation on at least one base table, with the view containing a first result set for a group-by on a first grouping set, and a second result set for a group-by on a second grouping set. In response to a change to the at least one base table, a controller updates the first result set by computing a change to the first result set based on a change in the at least one base table, and updates the second result set by computing a change to the second result set based on the change to the first result set.

22 Claims, 4 Drawing Sheets

MAINTAINING VIEWS OF CUBE-BASED OPERATIONS IN A DATABASE SYSTEM

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table.

Examples of SQL statements include INSERT, SELECT, UPDATE, and DELETE. The SELECT statement is used to retrieve information from a database and to organize information for presentation to a user or to an application program. A SELECT statement can include a GROUP BY clause, which specifies a grouping function to group the output results according to one or more attributes specified in the GROUP BY clause.

Starting with SQL-99 (also referred to as SQL3), further types of group-by operations have been defined, including group-by with grouping sets, group-by with rollup, and group-by with cube. These are all referred to as "cube-based" grouping or group-by operations. The following is an example of a SELECT statement with a GROUP BY CUBE clause (to specify a cube operation):

SELECT C1, C2, SUM(C3) AS "SUM"
FROM TABLE A
GROUP BY CUBE (C1, C2);

The result produced by a database system in response to such a SELECT statement is as follows:

| C1 | C2 | SUM |
|---|---|---|
| A | 1 | 1.0 |
| A | 2 | 2.3 |
| A | NULL | 3.3 |
| B | 1 | 8.0 |
| B | NULL | 8.0 |
| NULL | 1 | 9.0 |
| NULL | 2 | 2.3 |
| NULL | NULL | 11.3 |

In addition to the same groups returned by the ordinary GROUP BY clause, the GROUP BY CUBE clause further obtains a group of each group: the group of C1 having the "A" value (with C2 having a NULL or don't care value such that all rows of Table A where C1 has the "A" value are grouped); the group of C1 having the "B" value (with C2 having a NULL or don't care value such that all rows where C1 has the "B" value are grouped); the group of C2 having the "1" value (with C1 having a NULL or don't care value); the group of C2 having the "2" value (with C1 having a NULL or don't care value); and the group where both C1 and C2 have NULL values (in effect a grouping of all rows of Table A). In effect, a group-by cube operation involves grouping on all possible grouping sets. In the above example, given a cube function on attributes C1 and C2, the following are the possible grouping sets: {C1, C2}, {C1}, {C2}, and {All}.

Partial cube operations can be performed in response to query with GROUP BY ROLLUP or GROUP BY GROUPING SETS clauses. A partial cube operation involves group-bys on less than all possible grouping sets of a cube operation.

To enhance response times of cube-based operations, views that store results of cube-based operations are maintained. A view is a derived relation formed by performing a function (such as a cube-based operation) on one or more base relations. A materialized view is a pre-computed view that is actually stored by the database system. A database system can retrieve content of such a materialized view to increase the response time for computing a cube-based query.

An issue associated with storing a view containing results of cube-based operations is that maintenance of the view can be relatively expensive in terms of consumption of database system resources. Maintenance of a view refers to modifying the content of the view in response to changes (row insert, row delete, row update) in underlying base table(s). Note that a cube-based query is applied on one or plural base tables. Changes in such base table(s) will cause group-by results stored in the materialized view to change. Because a view may contain group-by results for a large number of grouping sets, the re-calculation of such group-by results in response to modifications of base table(s) can be computationally intensive if performed inefficiently.

SUMMARY

In general, methods and apparatus are provided to efficiently store, use, and maintain views that contain results of cube-based operations. For example, a database system includes a storage to store a view containing results of a cube-based operation on at least one base table, the view containing a first result set for a group-by on a first grouping set, and a second result set for a group-by on a second grouping set. In response to a change to the at least one base table, a controller updates the first result set by computing a change to the first result set based on a change in the at least one base table, and to update the second result set by computing a change to the second result set based on a change to the first result set.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
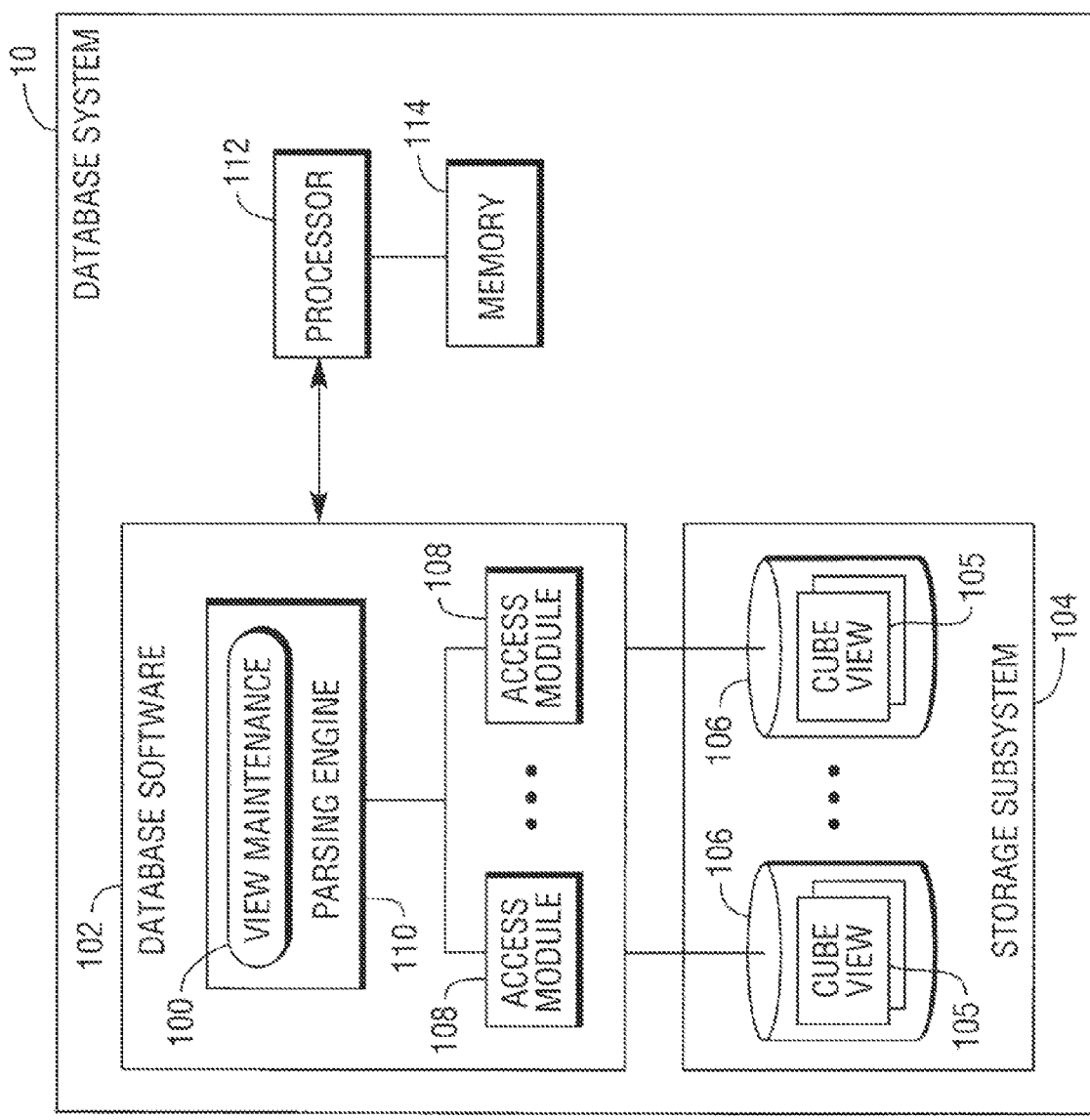
FIG. 1 is a block diagram of an example database system.

FIG. 1 illustrates an example arrangement of a database system 10 that is capable of performing cube or partial cube operations (more generally referred to as "cube-based" operations). The cube or partial cube operations are performed by cube or partial cube operators (more generally "cubed-based" operators), such as those invoked by Structured Query Language (SQL) SELECT statements that have a GROUP BY clause which specifies GROUPING SETS, CUBE, or ROLLUP, according to one example implementation.

A SELECT statement that specifies a cube-based operation often includes a GROUP BY clause with multiple grouping sets. For example, for a table having attributes A, B, C, and D, the grouping sets specified by an example partial cube query may be as follows: A, AB, BC, CD, DE, and DAB. The preceding example involves a partial cube operation that includes six grouping sets corresponding to six group-by operations: group-by on A, group-by on A and B, group-by on B and C, group-by on C and D, group-by on D and E, and group-by on D, A, and B. A partial cube query specifies less than all possible grouping sets of a table; on the other hand, a cube query specifies all possible grouping sets of grouping attributes. The grouping sets specified by a cube-based query make up a list of specified group-by operations to be performed in a cube based operation.

The database system 10 includes a view maintenance routine 100 (or multiple view maintenance routines 100) that are called by database software 102 running in the database system 10 for performing maintenance of cube views 105 stored in the database system. A "cube view" refers to a view that stores results of a cube-based operation. Cube-based operations refer to operations invoked by queries that specify group-by operations on multiple grouping sets.

As further shown in FIG. 1, a storage subsystem 104 includes plural storage modules 106. The storage modules 106 are logical representations of partitions of the storage subsystem 104. The cube view and base relations are stored in the storage modules 106. In the parallel arrangement shown in FIG. 1, each cube view 105 or base relation is distributed across the storage modules 106.

Each storage module 106 is accessible by a respective access module 108 that is part of the database software 102. Each access module 108 is capable of performing the following tasks: insert, delete, or modify contents of tables; create, modify, or delete the definitions of tables; retrieve information from definitions and tables; and lock database and tables. In one example, the access modules 108 are based on access module processors (AMPs) used in some TERADATA® database systems from NCR Corporation.

The database software 102 also includes one or more parsing engines 110. The Parsing engine 110 includes a parser that receives a query (e.g., an SQL query). The parser parses the query and checks the query for proper syntax. Based on the query, the parsing engine 110 generates steps to be performed by the access modules 108, with the parsing engine 110 sending the steps (in the form of instructions or commands) to the access modules 108, which in turn perform operations on data or data structures (e.g., tables, views, and so forth) stored in storage modules 106 in the storage subsystem 104.

As depicted in FIG. 1, the view maintenance routine(s) 100 are part of the parsing engine 110. In alternative embodiments, the view maintenance routine(s) 100 are separate from parsing engine 110.

The example arrangement shown in FIG. 1 is a parallel database system that includes multiple access modules 108 that are executable concurrently to access data stored in respective storage modules 106. In an alternative embodiment, instead of a multiprocessing system, a uni-processing system is employed.

The database software 102 (including the parsing engine 110, access modules 108, and view maintenance routines 100), along with other software modules, are executable on a processor 112, which is coupled to a memory 114. Other components (not shown) of the database system 10 include video components, network communication components to communicate with remote devices coupled over a network, and so forth. Examples of remote devices that can be coupled to the database system 10 are client stations that are capable of issuing queries to the database system 10, with the database system 10 processing the queries and returning the requested data back to the remote client stations.

Figure 2:
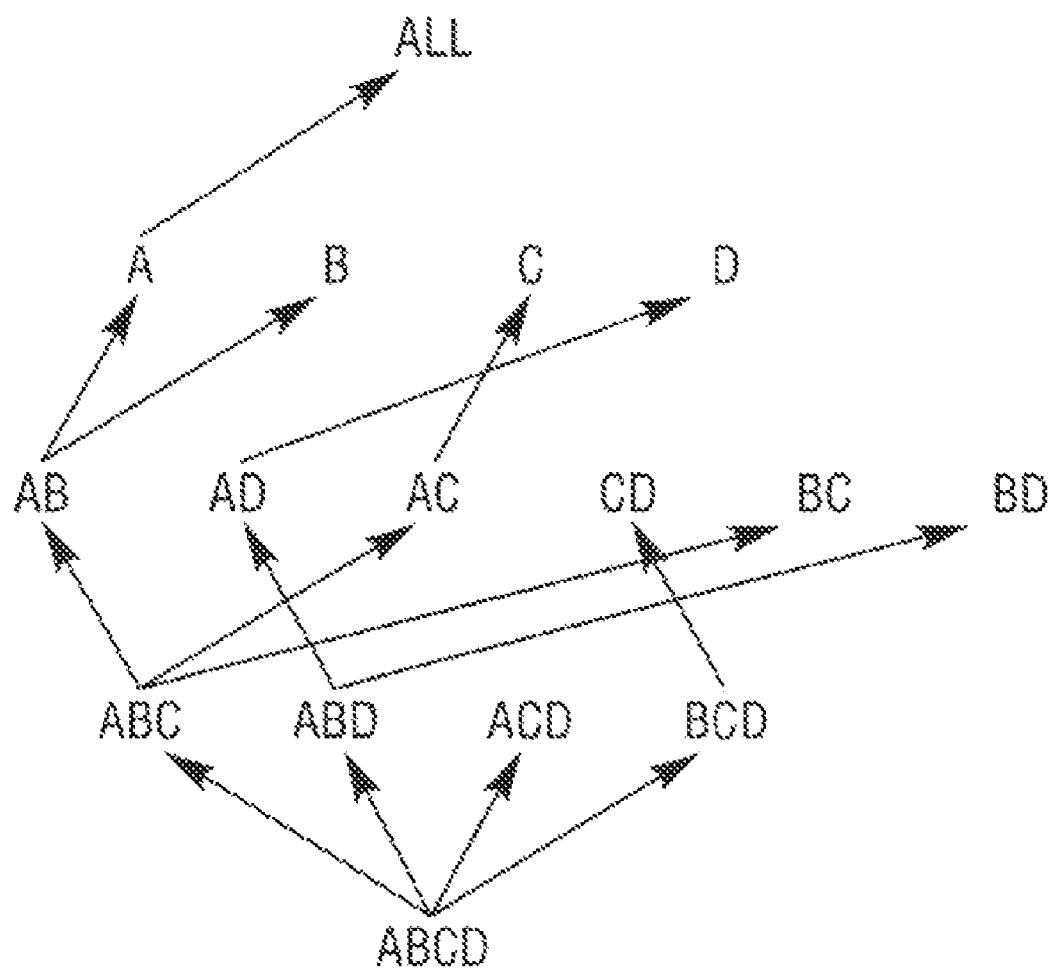
FIG. 2 illustrates a lattice that represents a cube operation.

FIG. 2 shows an example of a lattice for a cube operation. The output specified by the cube operation is the cube (A, B, C, D), and the table attributes are A, B, C, D. In this case, the entire cube is generated, with the nodes including, at the lowest level, node ABCD. Node ABCD represents a group-by operation on the grouping set A, B, C, D. The lattice also has a node at level 0, which is the All node. The All node corresponds to a group-by all operation (where A, B, C, and D are each set to the NULL or don't care value). In the cube operation, group-bys are performed on all possible grouping sets, including intermediate grouping sets represented by the intermediate nodes shown in FIG. 2 (node ABC, ABD, ACD, BCD, AB, AD, and so forth).

FIG. 2 depicts a cube operation. A partial cube operation on the same table attributes (A, B, C, D) involves less group-by operations than the full cube shown in FIG. 2. Thus, a partial group operation will involve less than all of the group-by operations indicated by FIG. 2. A cube view is a materialized view that stores the results of either full cube operations or partial cube operations (both referred to as "cube-based operations").

A cube view stores multiple grouping result sets, with each grouping result set containing rows that are generated by a group-by on a respective grouping set. Thus, for the example of FIG. 2, a first result set is stored for the group-by on the grouping set ABCD, a second result set is stored for the group-by on the grouping set ABC, a third result set is stored for the group-by on grouping set ABD, and so forth According to one embodiment, a cube view is stored in tabular format, with a special value "all" representing the column(s) being aggregated. For example, given a table t1(A, B, C), the following statement can be used to create a materialized cube view (referred to as JOIN INDEX JI_CUBE1):

CREATE JOIN INDEX JI_CUBE1 AS
SEL A, B, SUM(C)
FROM T1
GROUP BY CUBE(A, B);
The cube view JI_CUBE1 contains data as follows:

| A | B | sum(C) |
|---|---|---|
| 1 | 1 | 10 |
| 1 | 2 | 20 |
| 2 | 1 | 15 |
| 2 | 2 | 30 |
| 1 | all | 30 |
| 2 | all | 45 |
| all | 1 | 25 |
| all | 2 | 50 |
| all | all | 75 |

In the example above, the row containing values (1, all, 30) corresponds to a group-by on A where A has the value 1 (note that B is assigned the "all" value). Similarly, the row in the cube view containing values (all, 1, 25) corresponds to a group-by on B where B has the value 1 (note that A is assigned the "all" value).

The value "all" in the cube view is a special system reserved value that differentiates from other values, such as a numeric value, character value, null value, and so forth. The special "all" value is provided to enable efficient redistribution of rows in spool files during cube view maintenance. A spool file refers to a temporary table that stores intermediate results during database calculations.

In the parallel database system depicted in FIG. 1, each cube view 105 is distributed across the multiple access modules 108 according to a predefined primary index of the cube view. The rows of the cube view are distributed across the access modules 108 based on a hash of values of the primary index. Thus, if a hash of the primary index associated with a given row has a first value, then the row is distributed to a first access module 108. However, if a hash of the primary index of a second row of the cube view has a second value, then the second row of the cube view is distributed to a second access module 108. For other values of the hash of the primary index, other rows of the cube view are distributed to other access modules 108 of the database system.

In accordance to some embodiments of the invention, the primary index for a cube view is defined to be all the columns of a cube function. For example, the cube function of the example statement provided above is CUBE(A, B), so that the primary index for the cube view for storing the results of such a cube function includes columns A and B. The columns of the primary index are applied through a hashing algorithm. The hashing algorithm produces a hash value (based on the values of columns A and B) that is used to determine to which access module 108 a given row of the cube view is to be distributed. If a column has the "all" value, a special system reserved value will be substituted at the corresponding position when hashing on the primary index. The system reserved value can be any arbitrary predefined value.

To improve efficiency in maintaining a cube view according to some embodiments, the computation of a group-by on a given grouping set is based on another grouping set at a lower level. Thus, in the example of FIG. 2, the group-by on ABC can be calculated from the result set corresponding to the group-by on ABCD, which is computationally less intensive than computing the group-by on ABC from base table(s). That is because the result of the group-by on ABCD contains groups that can be merged together to obtain the result for the group-by on ABC, thereby requiring primarily a merge operation. In contrast, performing the group-by operation directly from base tables(s) would require scanning and sorting entire base table(s), which can consume large amounts of database systems resources.

In response to a modification of a given base table or tables (modification includes insertion of a new row, deletion of an existing row, or update of an existing row), the cube view is also modified to perform maintenance of the cube view. According to some embodiments of the invention, the change to the lowest level result set (e.g., the result set for the group-by on the grouping set ABCD in the example of FIG. 2) is calculated from the change of the base table directly. However, the change in the higher level result sets (group-bys on the grouping sets at the levels higher than the level of node ABCD) is calculated from lower level result sets. Thus, the result set for the group-by on ABC is calculated from the result set for the group-by on ABCD, the result set for the group-by on AB is calculated from the result set for the group-by on ABC, and so forth. By calculating the change of result sets based on previously calculated result sets of lower level group-bys, efficiency in the maintenance of the cube view is enhanced.

Another optimization in the cube view maintenance algorithm is the special hashing performed on intermediate spool files (which store intermediate results sets corresponding to the various group-bys). Normally, distribution of rows of table(s) is based on hashing of the columns of the particular grouping set. For example, in conventional systems, to calculate the group-by on the grouping set containing columns A, B, C, rows of base table(s) are distributed based on the hash of the columns A, B, C in this grouping set. One shortcoming of this distribution based on A, B, C is that distribution of the intermediate results would be different from the distribution of rows of the cube view, which for example of FIG. 2 is distributed based on the hash on A, B, C, D. As a result, a further distribution of intermediate results may be needed before the intermediate results can be merged into the cube view, which increases traffic over buses and links in the database system.

To address this issue, instead of hashing just on the group-by fields of a particular grouping set when distributing row for performing a group-by on the particular grouping set, the distribution of such rows is based on a hash of all fields of the cube function (A, B, C, D in the example of FIG. 2). This special hashing is referred to as "position hashing." Thus, in the example given above, in distributing the results of a group-by on ABCD for the purpose of calculating a group-by on ABC, a special hash of columns A, B, C, D is performed, instead of just columns A, B, C. In this special hashing, the value of the column D is assigned to the "all" value, which is the special reserved value. Similarly, to distribute results of a group-by on ABC across multiple access modules for the purpose of calculating the group-by on BC, the special hashing is performed on A, B, C, D, with A and D each assigned the special "all" value.

Thus, effectively, when distributing rows of a lower level result set for calculating the group-by on a given set of grouping fields, hashing on a larger set of grouping fields (larger than the given grouping set) is performed, with the extra field(s) assigned the special "all" value. Adding extra fields with a fixed special value (corresponding to the "all" value) at fixed positions will allow spool files containing group-by result sets to be aligned with the relational table of the cube view during the calculation process so that all sorting, aggregation, and merging can be done locally on corresponding access modules. Aligning the spool files with the cube view eliminates the extra traffic of redistributing the aggregate results, which enhances parallel execution of the cube view maintenance algorithm.

The following example illustrates the cube view maintenance algorithm according to some embodiments of the invention. Assume a table t2 defined as t2(A, B, C, D, E), where A, B, C, D, and E are attributes or columns of the table t2. A cube view is defined as follows:

CREATE JOIN INDEX JI_CUBE2 AS
SELECT A, B, C, D, SUM(E)
FROM T2
GROUP BY CUBE(A, B, C, D);

The cube view is assigned the name JI_CUBE2, which is maintained in the database system. As tuples are added to the base table t2, the cube view JI_CUBE2 is updated by the view maintenance routine 100 in response to modifications to the base table t2. In this example, the following rows are inserted into base table t2

| A | B | C | D | E |
|---|---|---|---|---|
| 1 | 1 | 1 | 1 | 0 |
| 1 | 1 | 1 | 1 | 1 |
| 1 | 1 | 1 | 2 | 2 |
| 1 | 1 | 1 | 2 | 3 |
| 1 | 1 | 2 | 1 | 10 |
| 1 | 1 | 2 | 1 | 9 |

| A | B | C | D | E |
|---|---|---|---|---|
| 1 | 1 | 2 | 2 | 4 |
| 1 | 1 | 2 | 2 | 8 |

The change to table t2 is represented by Δt2. In the above example, Δt2 includes eight rows. As discussed above, the cube view contains group-by results on different grouping sets at different levels. The lowest level includes the group-by result set on grouping set ABCD. The change to the lowest level result set is referred to as ΔABCD. The change to the result set for the group-by on ABCD is calculated from the change from the base table directly. The change to the lowest level result set (ΔABCD) is represented as 200 in FIG. 3, which shows the results of a group-by on ABCD on the base relation Δt2.

ΔABCD is stored in a spool file, which is an intermediate, temporary file used to store rows of intermediate results. After calculation of ΔABCD, a redistribution of the rows of ΔABCD is performed (at 202) for purposes of calculating the group-by on ABC, with the redistribution based on a hash on (A, B, C, all). A special "all" value is assigned to column D. Hashing on (A, B, C, all) produces a value for each of the rows of ΔABCD. Based on this hash value, each corresponding row of ΔABCD is redistributed to a corresponding access module 108.

Note that in performing the redistribution of the rows of ΔABCD, the rows sharing common values of A, B, C, are redistributed to the same access module 108. Thus, in the example of FIG. 3, the first two rows (1, 1, 1, 1) and (1, 1, 1, 2) are both redistributed to the same access module 108, since the D value for both these rows are assigned to the same special value. Similarly, the last two rows (1, 1, 2, 1) and (1, 1, 2, 2), are also redistributed to the same access module, since the value of column D has been reassigned to a special value.

Figure 3:
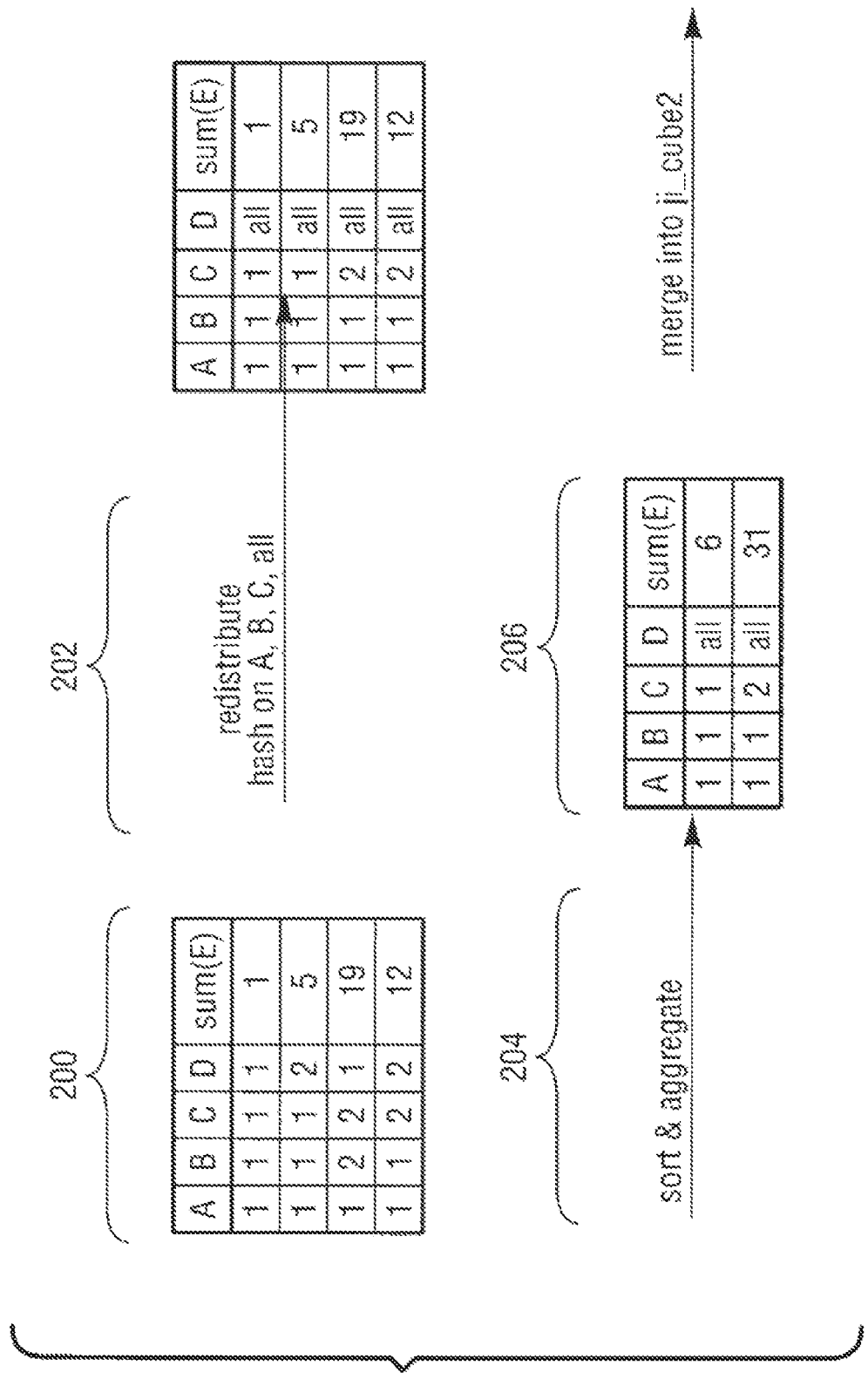
FIG. 3 illustrates an example of maintaining a cube view.

In each access module 108, a local sort and aggregate operation is performed (at 204). The local sort and aggregate operation produces another intermediate result, in this case the result set for the group-by on ABC. The table represented as 206 in FIG. 3 is ΔABC, which is the group-by result set on ABC based on the change to base table t2 (Δt2). Note that ΔABC is calculated from ΔABCD, and not from the base table Δt2, which would be computational more intensive. Other grouping result sets of the cube view can be calculated in similar fashion. For example, the result set for the group-by on ABD can also be calculated from ΔABCD. In this case, instead of assigning the "all" value to column D, the "all" value would be assigned to column C. Thus, distribution of ΔABCD in this case is based on a hash of (A, B, all, D). The result set for the group-by on ACD can also be calculated from ΔABCD, with the "all" value assigned to column B in this case.

The same technique is applied to the calculation of higher-level grouping result sets. The grouping result set corresponding to the group-by on AB (ΔAB) is calculated from ΔABC. Similarly, ΔAC is calculated from ΔABC, and ΔBC is calculated from ΔABC (or from ΔBCD). ΔAD is calculated from ΔABD, and ΔBD is calculated from ΔABD. ΔCD is calculated from ΔBCD. The next higher level of grouping result sets (group-bys on A, B, C, or D) are similarly calculated from the grouping result sets one level below. This continues until the grouping result set for the group-by on All has been determined for the change to the base relation t2.

More generally, a group-by on a first grouping set (having N columns) produces a first result set, and a group-by on a higher level grouping set (having N−1 columns) produces a second result set. The change to the second result set is computed based on the change to the first result set. Distribution of the first result set across the plural access modules 108 for computing the second result set is based on a hash of the N columns, where the column not in the second grouping set, which has N−1 columns, is assigned the special "all" value.

Figure 4:
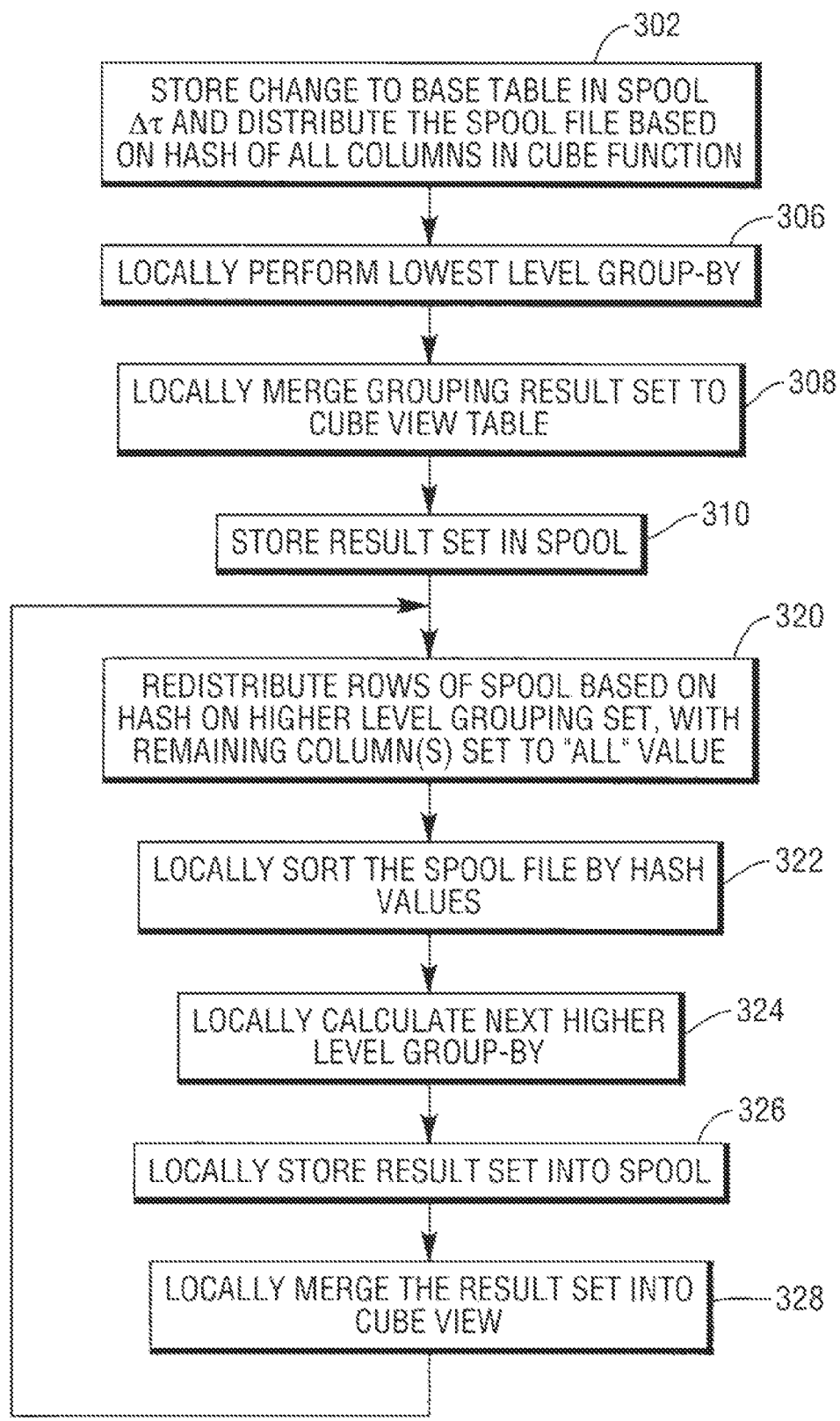
FIG. 4 is a flow diagram of a cube view maintenance algorithm, according to an embodiment.

FIG. 4 shows the maintenance algorithm performed by the database system 10 (such as by the view maintenance routines 100 in conjunction with the access modules 108 and parsing engine 110) for maintaining a cube view. In response to queries to modify a table t, the change to the base table is stored (at 302) in a spool file, referred to as Δt. Also, the rows of the spool file Δt are distributed based on a hash of all columns in the cube function. Thus, in the example of FIG. 2, where the cube function is CUBE(A, B, C, D), the distribution is based on the hash of A, B, C, D.

After distribution of the rows of Δt, each access module locally performs (at 306) the lowest level group-by to calculate the changes to the lowest level grouping result set (ΔABCD in the example above). Next, the lowest level result set is locally merged (at 308) into the cube view in each access module. Thus, a first portion of ΔABCD is locally merged into a corresponding portion of the cube view by a first access module 108, a second portion of ΔABCD is locally merged into a corresponding portion of the cube view by a second access module 108, and so forth. The lowest level result set is also stored (at 310) locally in a first spool.

Next, the rows of the first spool are redistributed (at 320) based on the hash on the higher level grouping set, with the remaining column(s) set to the "all" value. Thus, in the example above, to calculate ΔABC, redistribution of ΔABCD is based on the hash of the columns of the grouping set ABCD, where column D is set to the "all" value. Next, the redistributed spool file is locally sorted (at 322) by each access module based on hash values. The second level group-by is then locally calculated (at 324). In the example, one of the second level group-bys produces the result set ΔABC. The calculated second level grouping result set is then locally stored in a second spool (at 326). Next, the calculated second level result set is locally merged by each access module 108 into the respective portion of the cube view (at 328). A first portion of the second level result set is merged into a first portion of the cube view by a first access module 108, a second portion of the second level result set is merged into a second portion of the cube view by a second access module 108, and so forth.

The acts of 320-328 are repeated for all the other grouping result sets of the cube view, including the remaining grouping result sets at the second level and at higher levels. At each level, the database system starts with a spool file obtained from a previous level and generates new spool files for the result sets at the new level. For the result sets that cannot be calculated from a given spool file, the database system starts from another spool file obtained from the previous level until all the grouping result sets are calculated.

A benefit of maintaining materialized cube views is that certain subsequent queries can be more efficiently calculated from the cube view. Certain queries contain GROUP BY clauses (which operate on the same set of tables and have the same aggregate function, such as SUM, AVG, MIN, MAX, and so forth) can derive results from the materialized cube view. A coverage algorithm implemented by the database system looks at the GROUP BY clause of each received query to determine if a cube view can be used to answer a given query (that is, coverage exists). In a first scenario, the GROUP BY clause of a query includes only a single set of grouping fields S (that is, the query specifies only one grouping set). If S is a subset of C, which is the set of all fields in the cube function. For example, if the cube function is CUBE(A, B, C, D), then C contains {A, B, C, D}.

If coverage exists, then the query is rewritten in the following manner.

Let $C=S+\Delta S$;
for each element $f_i$ in S and $f_j'$ in $\Delta S$, add the following conditions to the WHERE clause of the received query: $f_i$ IS NOT ALL AND $f_j'$ IS ALL;

The modified WHERE clause causes retrieval of rows from the cube view for rows where the column(s) in S do not have the "all" value but the column(s) in $\Delta S$ have the "all" value. For example, given a cube view on the function CUBE(A, B, C, D), S={A, B} and $\Delta S$={C, D}, the modified WHERE clause specifies rows where the values of C and D are "all" but the values of A and B are not "all," that is, A and B have a numeric value, character value, or other value.

In a second scenario, a received query contains a GROUP BY clause that has multiple grouping sets $S_1, S_2, \ldots, S_N$. If S is defined to be the union of $S_1, S_2, \ldots, S_N$, then coverage exist if S is a subset of C. If there is coverage, then query rewrite is performed as follows:

for each set $S_k$ (k=1 ... N), Let $C=S_k+\Delta S_k$;
for each element $f_i$ in $S_k$ and $f_j'$ in $\Delta S_k$, add the following conditions to the WHERE clause of the received query:
$f_i$ IS NOT ALL AND IS ALL
Let the result of the above query be $A_k$;
The final result=union of $A_k$;

The modification of the query is performed individually for each grouping set $S_k$ (k=1 ... N). The WHERE clause is modified in the same manner as for the first scenario. However, for the second scenario, multiple results $A_k$ (k=1 ... N) are obtained. The final result is the union of $A_k$ (k=1 ... N).

A third scenario involves a query with a GROUP BY clause that contains a ROLLUP function. The ROLLUP function specifies a sequence of grouping sets that are contained in R. If R is a subset of C, then coverage exists. In this case, R is defined as containing the following grouping sets: $S_1, S_2, \ldots, S_N$, that result from the ROLLUP function. The query rewrite is then performed as for the second scenario.

Finally, a fourth scenario involves a query that has a GROUP BY clause with a CUBE function with set C'. If C' is a subset of C, then coverage exists. In this case, the query rewrite is performed as follows:

Let $C=C'+\Delta C'$;
for each element $f_j'$ in $\Delta C'$, add the following conditions to the WHERE clause of the received query: $f_j'$ IS ALL;

This causes rows to be retrieved from the cube view where the column(s) in $\Delta C'$ contain(s) the "all" value.

The database system discussed above includes various software routines or modules (including the database software 102 and other software components). Such software routines or modules are executable on corresponding control modules. The control modules include microprocessors, microcontrollers, or other control or computing devices. As used here, a "controller" refers to a hardware component, software component, or a combination of the two. A "controller" can also refer to plural hardware components, software components, or a combination of hardware components and software components.

Instructions of the software routines or modules are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; or optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A database system comprising:
    processors;
    a storage subsystem having plural storage modules to store respective portions of a view containing results of a cube-based operation on at least one base table, the view containing a first result set for a group-by on a first grouping set, and a second result set for a group-by on a second grouping set, wherein the second grouping set has less attributes than the first grouping set; and
    database software executable on the processors and having plural access modules that provide parallel access of data in the plural storage modules, wherein the database software executable on the processors is configured to:
        distribute the portions of the view across the plural storage modules based on hash values computed by hashing plural attributes specified by a function defining the view;
        in response to a change to the at least one base table:
            update the first result set by computing a change to the first result set based on the change in the at least one base table;
            distribute rows of the change to the first result set across the plural storage modules based on hash values computed by hashing the attributes of the second grouping set and at least one other attribute that is part of the first grouping set but not the second grouping set, wherein the at least one other attribute is assigned a predefined value used by said database software executable to perform the hashing of the attributes of the second grouping set and the at least one other attribute; and
            update the second result set by computing a change to the second result set based on the distributed rows of the change to the first result set.

2. The database system of claim 1, wherein the first grouping set has a first number of grouping attributes, and the second grouping set has a second number of grouping attributes, the first number being greater than the second number.

3. The database system of claim 1, wherein the view contains results of a group-by cube operation.

4. The database system of claim 1, wherein the view contains results of a group-by partial cube operation.

5. The database system of claim 1, wherein the function is a cube function, and the view contains results of a cube operation specified by the cube function on the plural attributes, and wherein the at least another attribute is one of the plural attributes of the cube function that is not in the second grouping set.

6. The database system of claim 1, wherein the rows of the change to the first result set are distributed across the access modules according to the hashing of the attributes of the second grouping set and the at least one other attribute enabling:
   each access module to locally perform a merge and aggregate operation on the rows of change to the first result set to update the second result set; and
   each access module to locally merge the rows of the change to the second result set into a respective portion of the view without having to first redistribute the rows of the change to the second result set.

7. The database system of claim 1, wherein the database software is configured to further:
   receive a query specifying a group-by operation; and
   determine whether an answer for the query specifying the group-by operation is satisfied from the view.

8. The database system of claim 7, wherein the query specifies a group-by operation on grouping sets S, and the view contains result sets for grouping sets C,
   the database software being configured to determine whether S is a subset of C to determine whether the answer for the query can be satisfied from the view.

9. The database system of claim 8, wherein the database software is configured to modify a WHERE clause of the query in response to determining that S is a subset of C.

10. The database system of claim 1, wherein the view further contains a third result set for a group-by on a third grouping set having less attributes than the second grouping set, and wherein the database software is configured to further:
    distribute rows of the change to the second result set across the plural storage modules based on hash values computed by hashing the attributes of the third grouping set and at least two other attributes that are part of the first grouping set but not the third grouping set, wherein the at least two other attributes are assigned the predefined value to perform the hashing of the attributes of the third grouping set and the at least two other attributes; and
    update the third result set by computing a change to the third result set based on the distributed rows of the change to the second result set.

11. The database system of claim 10, wherein all of the attributes of the second grouping set are part of the first grouping set, and all of the attributes of the third grouping set are part of the second grouping set.

12. A method for use in a database system, comprising:
    storing a view containing results of a cube-based operation on at least one base table, the view containing result sets for group-bys on respective grouping sets, wherein portions of the view are distributed across plural storage modules of a storage subsystem, wherein the result sets include a first result set and a second result set, wherein the first result set is for a group-by on a first of the grouping sets, and the second result set is for a group-by on a second of the grouping sets, and wherein the second grouping set has less attributes than the first grouping set;
    accessing data in the plural storage modules in parallel by corresponding plural access modules in database software executing on processors;
    distributing, by the processors, the portions of the view across the plural storage modules based on hash values computed by hashing plural attributes specified by a function defining the view:
    updating, by the processors, the first result set by computing a change to the first result set based on a change in the at least one base table;
    distributing, by the processors, rows of the change to the first result set across the plural storage modules based on hash values computed by hashing the attributes of the second grouping set and at least one other attribute that is part of the first grouping set but not the second grouping set, wherein the at least one other attribute is assigned a predefined value used by said processors to perform the hashing of the attributes of the second grouping set and the at least one other attribute; and
    updating, by the processors, the second result set by computing a change to the second result set based on the distributed rows of the change to the first result set.

13. The method of claim 12, further comprising updating a third result set by computing a change to the third result set based on the change to the second result set.

14. The method of claim 13, further comprising updating a fourth result set by computing a change to the fourth result set based on the change to the third result set.

15. The method of claim 12, wherein the first result set corresponds to the group-by on the first grouping set having N attributes, and the second result set corresponds to the group-by on the second grouping set having N−1 attributes, and wherein the N−1 attributes in the second group set are all part of the first grouping set.

16. The method of claim 15, wherein the result sets of the view further comprise a third result set for a group-by on a third of the grouping sets, wherein the third grouping set has less attributes than the second grouping set, the method further comprising:
    distributing rows of the change to the second result set across the plural storage modules based on hash values computed by hashing the attributes of the third grouping set and at least two other attributes that are part of the first grouping set but not the third grouping set, wherein the at least two other attributes are assigned the predefined value to perform the hashing of the attributes of the third grouping set and the at least two other attributes;
    updating the third result set by computing a change to the third result set based on the distributed rows of the change to the second result set.

17. The method of claim 16, wherein the function is a cube function, and wherein storing the view comprises storing the view for a cube operation based on the cube function of the N attributes.

18. The of claim 12, wherein the first result set corresponds to the group-by on the first grouping set having N attributes, and the second result set corresponds to the group-by on the second grouping set having N−1 attributes, and wherein the N−1 attributes in the second group set are all part of the first grouping set.

19. The of claim 18, wherein the function is a cube function, and wherein storing the view comprises storing the view for a cube operation based on the cube function of the N attributes.

20. An article comprising at least one storage medium containing instructions that when executed cause a database system to:

store a view containing results of a cube-based operation on at least one base table, the view containing result sets for group-bys on respective grouping sets, wherein portions of the view are distributed across plural storage modules of a storage subsystem, wherein the result sets include a first result set and a second result set, wherein the first result set is for a group-by on a first of the grouping sets, and the second result set is for a group-by on a second of the grouping sets, and wherein the second grouping set has less attributes than the first grouping set;

access data in the plural storage modules in parallel by corresponding plural access modules in database software in the database system;

distribute the portions of the view across the plural storage modules based on hash values computed by hashing plural attributes specified by a function defining the view;

update the first result set by computing a change to the first result set based on a change in the at least one base table; and distribute rows of the change to the first result set across the plural storage modules based on hash values computed by hashing the attributes of the second grouping set and at least one other attribute that is part of the first grouping set but not the second grouping set, wherein the at least one other attribute is assigned a predefined value used by said database system in the execution of the instructions to perform the hashing of the attributes of the second grouping set and the at least one other attribute; and update the second result set by computing a change to the second result set based on the distributed rows of the change to the first result set.

21. The article of claim 20, wherein the instructions when executed cause the database system to further update a third result set by computing a change to the third result set based on the change to the second result set.

22. The article of claim 20, wherein the result sets of the view further include a third result set for a group-by on a third of the grouping sets having less attributes than the second grouping set, and wherein the instructions when executed cause the database system to further:

distribute rows of the change to the second result set across the plural storage modules based on hash values computed by hashing the attributes of the third grouping set and at least two other attributes that are part of the first grouping set but not the third grouping set, wherein the at least two other attributes are assigned the predefined value to perform the hashing of the attributes of the third grouping set and the at least two other attributes; and update the third result set by computing a change to the third result set based on the distributed rows of the change to the second result set.

\* \* \* \* \*